US012303815B2

(12) United States Patent
Thomas et al.

(10) Patent No.: US 12,303,815 B2
(45) Date of Patent: May 20, 2025

(54) SYSTEM AND PROCESS FOR RECOVERING FUGITIVE GAS EMISSIONS

(71) Applicant: Thomas Energy Systems, Inc., Tulsa, OK (US)

(72) Inventors: Vincent A. Thomas, Tulsa, OK (US); Dana Bardeaux, Tulsa, OK (US); Johnny R. Stout, Tulsa, OK (US)

(73) Assignee: Thomas Energy Systems, Inc., Tulsa, OK (US)

( * ) Notice: Subject to any disclaimer, the term of this patent is extended or adjusted under 35 U.S.C. 154(b) by 420 days.

(21) Appl. No.: 18/050,980

(22) Filed: Oct. 28, 2022

(65) Prior Publication Data

US 2023/0136358 A1    May 4, 2023

Related U.S. Application Data

(60) Provisional application No. 63/273,119, filed on Oct. 28, 2021.

(51) Int. Cl.
| | |
|---|---|
| *B01D 46/00* | (2022.01) |
| *B01D 46/42* | (2006.01) |
| *F04B 19/22* | (2006.01) |
| *F04C 2/02* | (2006.01) |

(52) U.S. Cl.
CPC ..... *B01D 46/0031* (2013.01); *B01D 46/0047* (2013.01); *B01D 46/4263* (2013.01); *F04B 19/22* (2013.01); *F04C 2/025* (2013.01)

(58) Field of Classification Search
CPC ............ B01D 46/4263; B01D 46/0031; B01D 46/0047; F25J 1/0022; F25J 1/0035

USPC .......................................................... 95/273
See application file for complete search history.

(56) References Cited

U.S. PATENT DOCUMENTS

| | | | |
|---|---|---|---|
| 9,776,155 B1 * | 10/2017 | Mueller ................. | B01J 8/0496 |
| 2011/0094593 A1 * | 4/2011 | Malm .................... | F02D 19/081 |
| | | | 123/434 |
| 2021/0054837 A1 * | 2/2021 | Robbins ................ | F04B 49/065 |

OTHER PUBLICATIONS

Slater, D.J. , "TESCorp strikes back against methane", CompressorTech2, Nov. 2020.

* cited by examiner

*Primary Examiner* — Long T Tran
*Assistant Examiner* — James J Kim
(74) *Attorney, Agent, or Firm* — Crowe & Dunlevy, P.C.

(57) ABSTRACT

This invention generally relates to a system and process for recovering fugitive gas emissions, and more particularly, systems and processes for recovering wet and dry gas emissions from reciprocating compressor packing boxes, gas-operated control valves and pumps, and other packing systems that leak under normal operating conditions. The system and process recover fugitive gases from a compressor packing case and pneumatic components by utilizing a backpressure regulator to maintain a positive pressure in the packing case and pneumatic components and then producing a vacuum to capture and transport any fugitive gas emissions. The recovered emissions are then pressurized to meet the pressures necessary to reenter the first stage of the compressor packing case or the compressor fuel gas system.

19 Claims, 15 Drawing Sheets

Emission Factors

Table 4.2: Default Emission Factors for Reciprocating Compressor Rod Packing[A,B,C]

| Industry Sector | Methane Emission Factor (scm/hour-compressor) | Methane Emission Factor (scf/hour-compressor) |
|---|---|---|
| Production (Well Pads)[17] | 0.031 | 1.08 |
| Gathering & Boosting[18] | 2.4 | 85.5 |
| Processing[19] | 4.03 | 142.5 |
| Transmission[20] | 5.3 | 188.1 |
| Storage[21] | 6.5 | 229.5 |

A These compressor-based operating emission factors assume an average number of cylinders per compressor as follows: Production (4), Gathering and Boosting (3.3), Processing (2.5), Transmission (3.3), and Storage (4.5).
B Methane content by sector: Production (79 percent); Processing (87 percent); Transmission, Storage, and Distribution (94 percent). (Source: EPA, Natural Gas STAR Lessons Learned. https://www.epa.gov/sites/production/files/2016-06/documents/ll_rodpack.pdf.)
C A factor of 150% should be applied to default operating emission factors for standby under pressure factors. https://www.epa.gov/sites/production/files/2016-06/documents/ll_compressorsoffline.pdf.]

FIG. 2
PRIOR ART

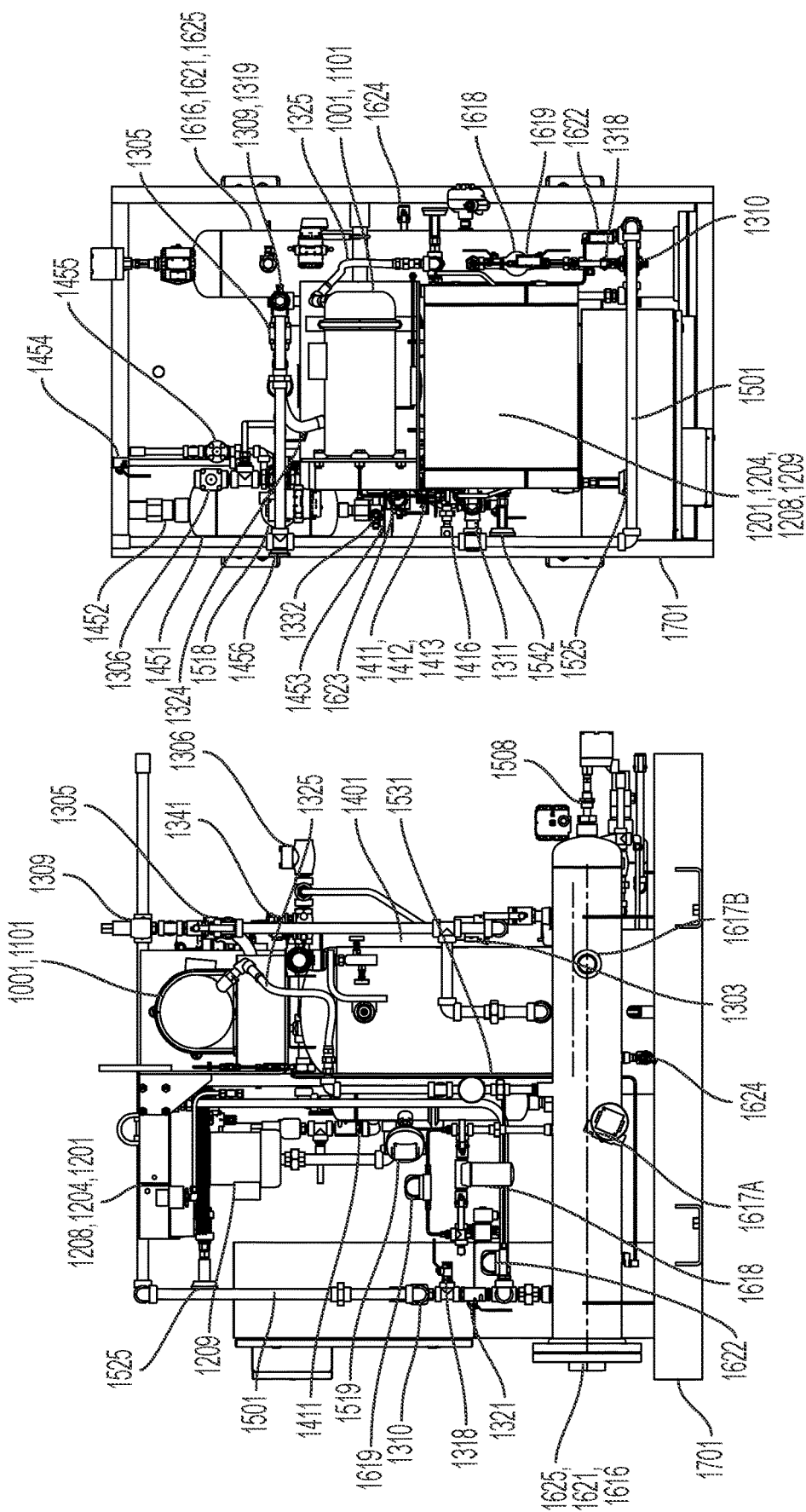

SYSTEM AND PROCESS FOR RECOVERING FUGITIVE GAS EMISSIONS

CROSS-REFERENCE TO RELATED APPLICATIONS

This application claims the benefit of U.S. Provisional Patent Application No. 63/273,119, filed Oct. 28, 2021, and incorporates said provisional application by reference into this document as if fully set out at this point.

STATEMENT REGARDING PRIOR DISCLOSURES BY THE INVENTOR

This application incorporates Slater, D. J., *TESCorp strikes back against methane*, CompressorTech[2], November 2020, by reference into this document as if fully set out at this point.

BACKGROUND OF THE INVENTION

1. Field of the Invention

This invention generally relates to a system and process for recovering fugitive gas emissions, and more particularly, systems and processes for recovering wet and dry gas emissions from reciprocating compressor packing boxes, gas-operated control valves and pumps, and other packing systems that leak under normal operating conditions.

2. Description of the Related Art

Reciprocating compressors in the oil and gas industry commonly emit natural gas (where methane is the main component) during normal operation and during standby under pressure. Reciprocating compressors typically have multiple cylinders, and each cylinder piston rod has a packing case (FIG. 1). Reciprocating compressor maintenance practices may vary, and rod packing vents may be configured. The natural gas emissions from reciprocating compressors can be vented to the environment from the rod packing and blowdowns or as fugitive gases from the various compressor components. Currently, more than 51,000 reciprocating compressors are operating in the U.S. natural gas industry, each with an average of four cylinders, representing over 200,000 piston rod packing systems. These systems contribute over 72.4 billion cubic feet per year of methane emissions to the atmosphere, one of the largest sources of emissions at natural gas compressor stations.

All packing systems leak under normal conditions, the amount of which depends on cylinder pressure, fitting and alignment of the packing parts, and amount of wear on the rings and rod shaft. A properly aligned and fitted new packing system may lose approximately 11 to 12 standard cubic feet per hour (scfh). As the system ages, however, leak rates increase from wear on the packing rings and piston rod. Lubricating oil injected into the packing parts can help seal the rings and cups, reduce the wear caused by the operation, and lower heat build-up that accelerates ring wear; however, over the thousands of hours of typical compressor operation, rings wear and leakage increase. The average leakage of large, high-pressure reciprocating compressors ranges from 24 to 150 scfh.

One company recently reported measuring emissions of 900 scfh from one compressor rod packing. Under the best conditions, new packing systems properly installed on a smooth, well-aligned shaft can be expected to leak a minimum of about 11.5 scfh. Higher leak rates result from fit, packing parts' alignment, and wear. Leakage typically occurs from four areas: 1) around the packing case through the nose gasket; 2) between the packing cups, which are typically mounted metal-to-metal against each other; 3) around the rings from slight movement in the cup groove as the rod moves back and forth; and/or 4) between the rings and piston rod. Factors other than normal wear can also contribute to emissions, such as faulty installation and damaged components (e.g., cups, rings, gaskets).

A recent EPA study released in the Natural Gas STAR Program, "Estimates of Methane Emissions by Segment in the United States," concerning methane leakage into the environment, stated that methane emissions account for 9.5% of all greenhouse gases (FIG. 2). When based upon $CO_2$, these emissions have a comparative effect on the environment that is 25 times that of equivalent $CO_2$. The study further found that the energy industry is the second largest source of methane emissions. A 2018 study of these gas emissions, as reported by the EPA, estimated that these methane emissions total approximately 175 million metric tons of carbon dioxide equivalent ($MMTCO_2e$) per year to the environment. Of that total, 19% was emitted from the oil and gas industry's transmission and storage facilities, equating to an emission source of approximately 34 $MMTCO_2e$. The breakdown of those emission leaks is 0.68 $MMTCO_2e$ from gas-operated pneumatic controllers, 15.0 $MMTCO_2e$ from gas compression equipment seal and packing leaks, 3.1 $MMTCO_2e$ from centrifugal compressors, and 11.9 $MMTCO_2e$ from reciprocating compressors.

Additionally, the same report indicated that the gas processing industry accounted for an additional 12 $MMTCO_2e$ of emissions per year to the environment. A similar breakdown of the leaks can also be attributed to 0.68 $MMTCO_2e$ from gas-operated pneumatic controllers, 15.0 $MMTCO_2e$ from gas compression equipment, 1.0 $MMTCO_2e$ from centrifugal compressors, and 1.56 $MMTCO_2e$ from reciprocating compressors.

BRIEF SUMMARY OF THE INVENTION

The invention relates to a system and process having an emissions recovery unit that is fluidly coupled to a compressor packing case and other fugitive gas sources, pneumatic pumps, and valves. The system and process maintain a positive pressure in the packing case and then evacuate the gas vapors by producing a vacuum to capture and transport the leaking gas emissions from the packing case to the emissions recovery unit. The system and process pressurize the recovered gas to meet the existing pressure needed to reenter either the first stage of the compressor or the compressor fuel gas systems. As the volumes vary in the packing case, the system and process actuate control valves or operate pumps to maintain a constant vacuum to meet varying flow rates.

Accordingly, it is an object of this invention to provide an improved system and process for recovering fugitive gas emissions.

Another object of this invention is to provide a system and process for recovering fugitive gas emission sources that can be captured and restored to the process without emitting them into the atmosphere.

A further object of this invention is to provide a system and process for recovering wet and dry gas emissions from reciprocating compressor packing boxes, gas-operated control valves and pumps, pneumatic systems, and other packing systems that leak under normal operating conditions without emitting the gas emissions to the environment.

A further object of this invention is to provide a system and process for recovering fugitive gas emissions that allows operators to defer packing system changes over much longer periods of operation, thus reducing maintenance and downtime costs.

BRIEF DESCRIPTION OF THE DRAWINGS

The above and other objects and advantages of this invention may be more clearly seen when viewed in conjunction with the accompanying drawing wherein:

FIG. 2 is a tabular view of emission factors for reciprocating compressor rod packing systems by industry sector as reported by the EPA in the Natural Gas STAR Program, "Estimates of Methane Emissions by Segment in the United States."

FIG. 5C is a front elevation view of the emission recovery unit shown in FIG. 4.

FIG. 5D is a second side elevation view of the emission recovery unit shown in FIG. 4.

DETAILED DESCRIPTION OF THE INVENTION

Figure 1:
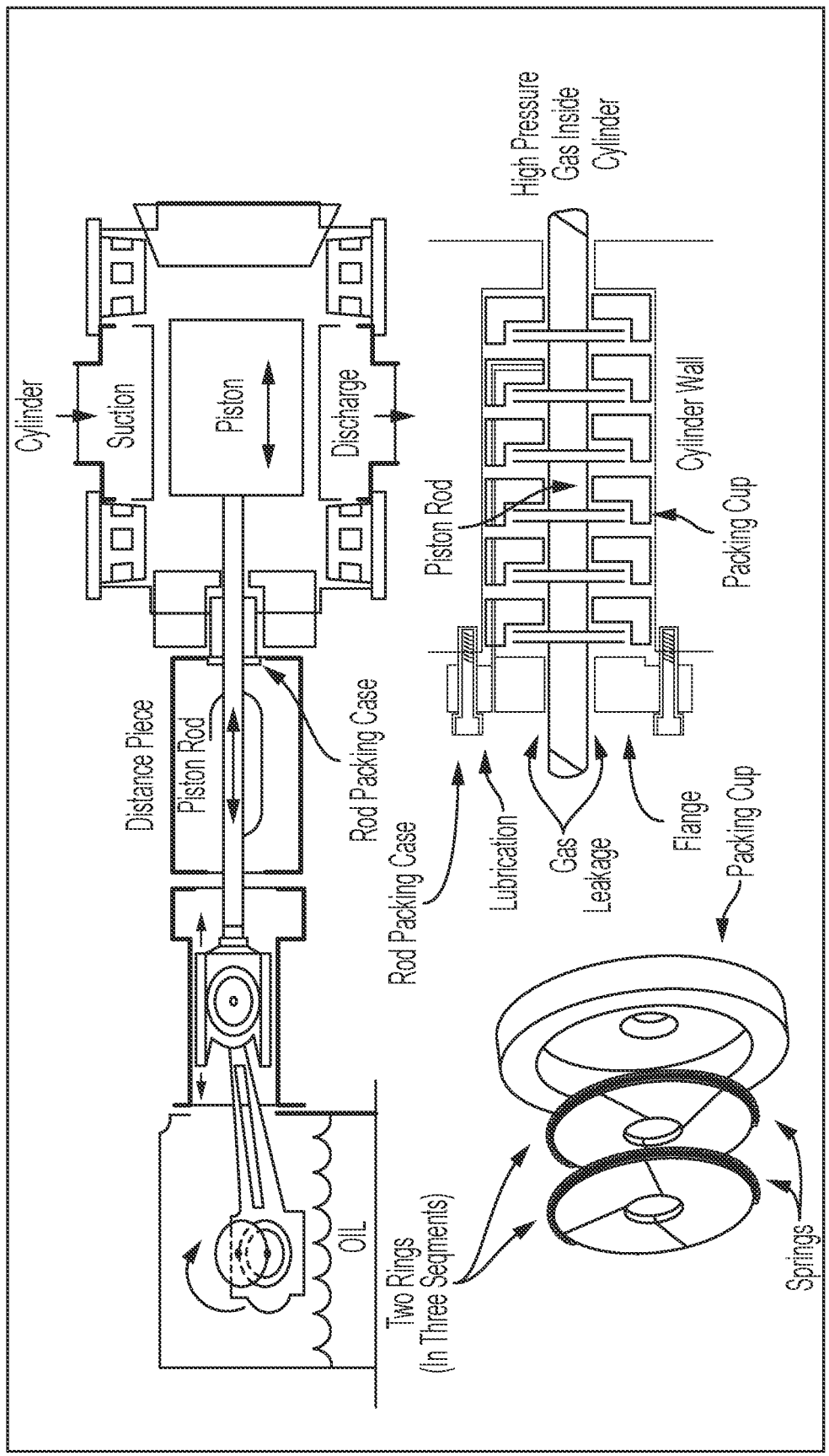
FIG. 1 is a side-sectional illustration of a typical reciprocating compressor rod packing system.

While this invention is susceptible to embodiment in many different forms, there are shown in the drawings and will herein be described in detail some specific embodiments of the invention. It should be understood, however, that the present disclosure is to be considered an exemplification of the principles of the invention and is not intended to limit the invention to the specific embodiments so described.

In general, the invention relates to a system and process for recovering fugitive gas emissions, and more particularly, a system and process for recovering wet or dry gas emissions from reciprocating compressor rod packing systems, gas-operated control valves and pumps, pneumatic systems, and other packing systems that leak under normal operating conditions without emitting the gas emissions to the environment. The inventive system and process allow existing wet or dry gas pipelines, utility compression systems, and pneumatic components to meet and comply with the EPA's "New Source Performance Standards" (40 CFR § 60, subpart OOOOa). As used herein, "dry gas" is pipeline-quality gas that has been processed down to almost pure methane, with less than 7 lbs. water content per 1,000,000 cubic feet (CF), whereas "wet gas" is found in the natural state as produced in the oil field. The inventive system and process can also handle saturated gases that contain natural gas liquids (NGLs) and are water saturated.

The system and process for recovering fugitive gas emissions from gas compression systems and gas-operated components include an emissions recovery unit 1000 that is designed for either dry gas applications (up to 970 Btu/CF, less than 7 lbs. water per MMCF) (FIGS. 4 through 7) or wet gas applications (up to 2500 Btu/CF) (FIGS. 8 through 11). The system and process can have capacities of up to 1500 scfh and discharge pressures of up to 200 pounds per square inch in gauge (psig).

Figure 3:
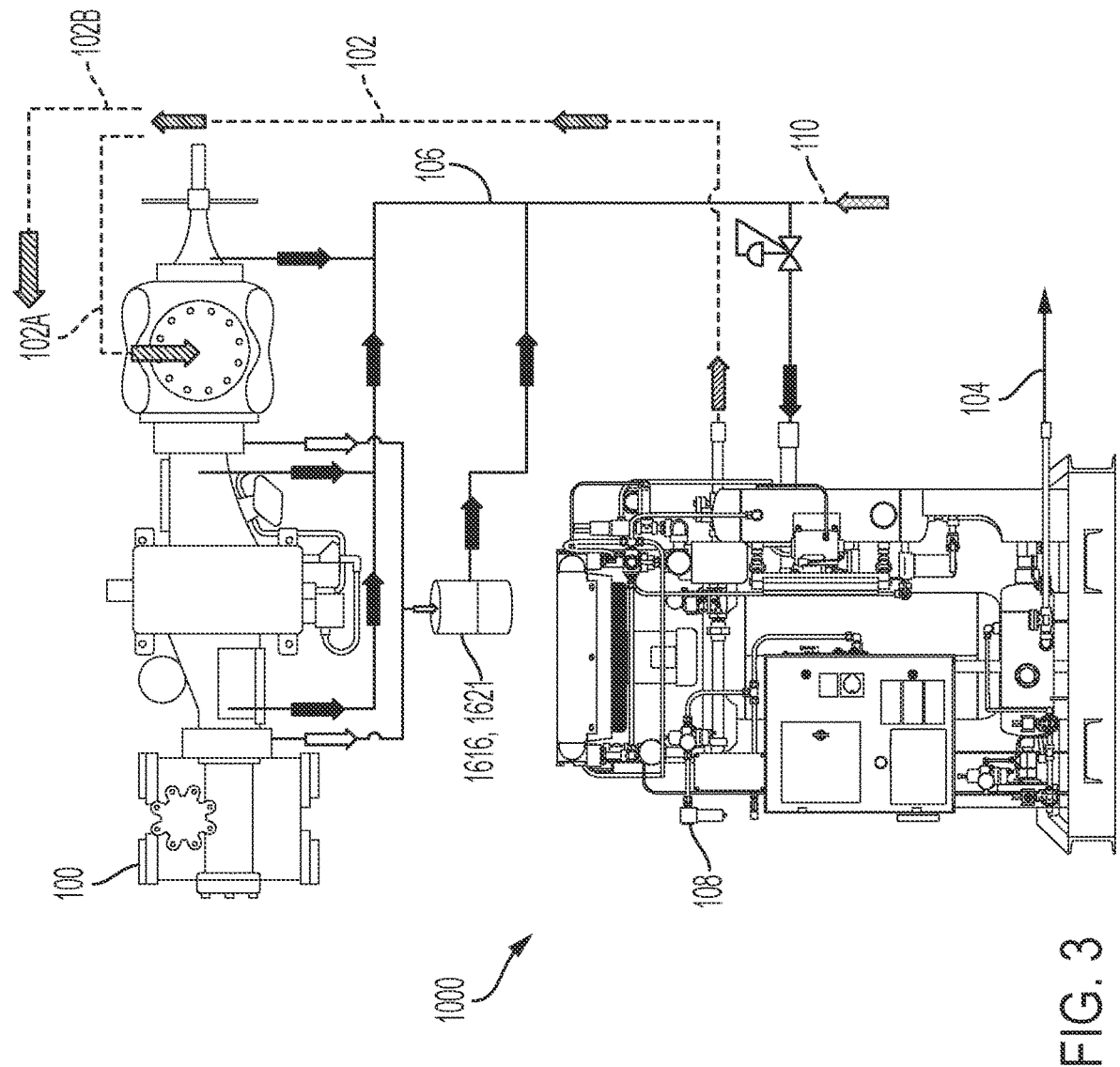
FIG. 3 is a schematic illustration of an example of an emission recovery unit fluidly coupled to a reciprocating compressor rod packing system for recovering fugitive gas emissions in accordance with an illustrative embodiment of the invention disclosed herein.
Figure 4:
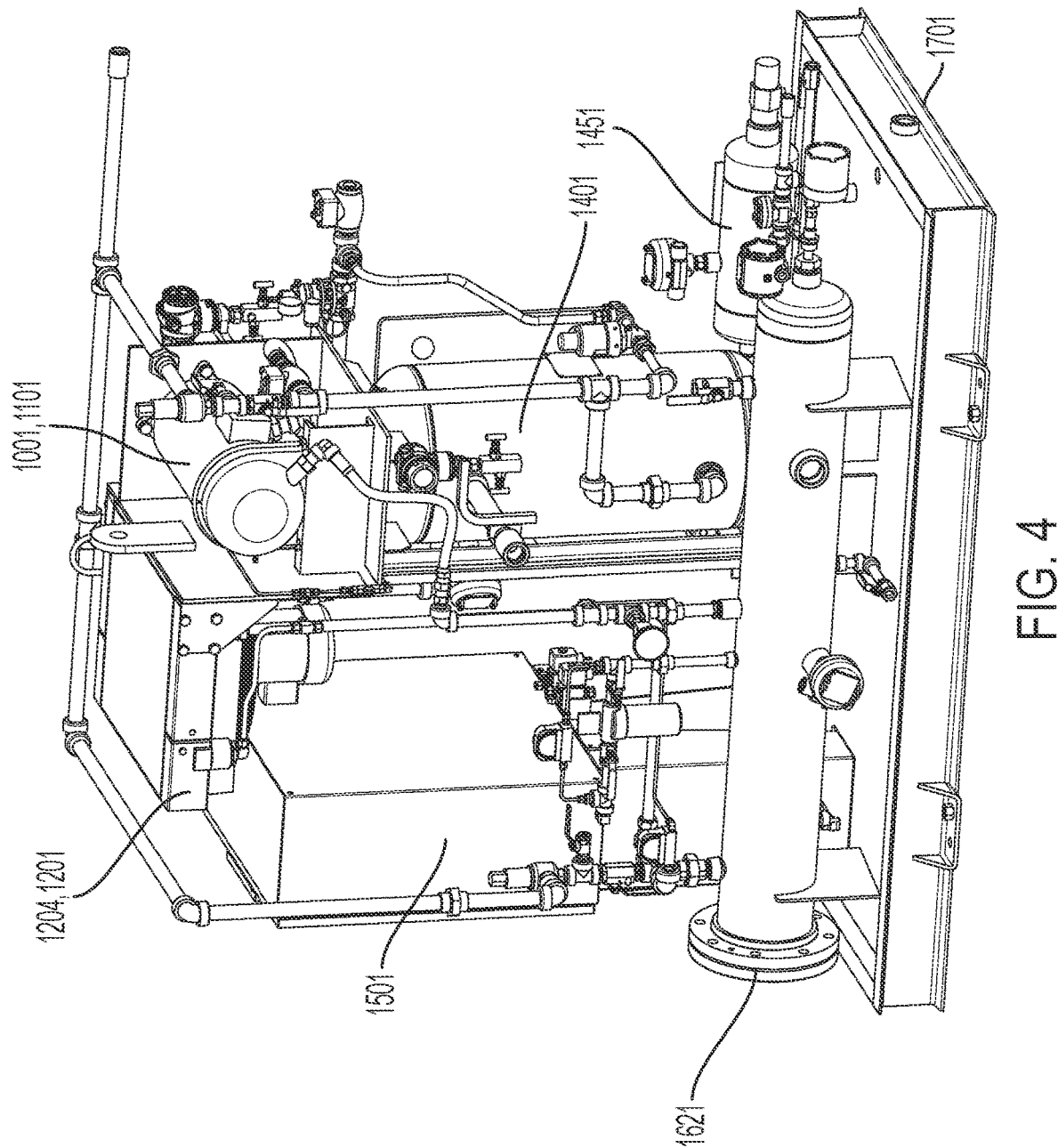
FIG. 4 is a perspective view of an example of an emission recovery unit for recovering dry gas emissions in accordance with an illustrative embodiment of the invention disclosed herein.
Figure 5B:
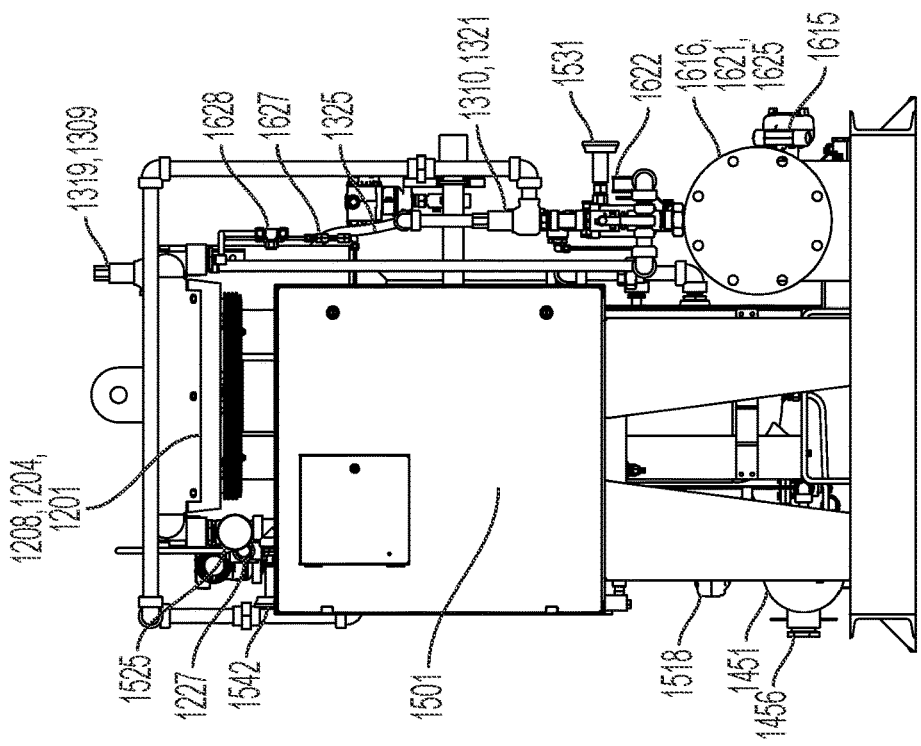
FIG. 5B is a first side elevation view of the emission recovery unit shown in FIG. 4.
Figure 5A:
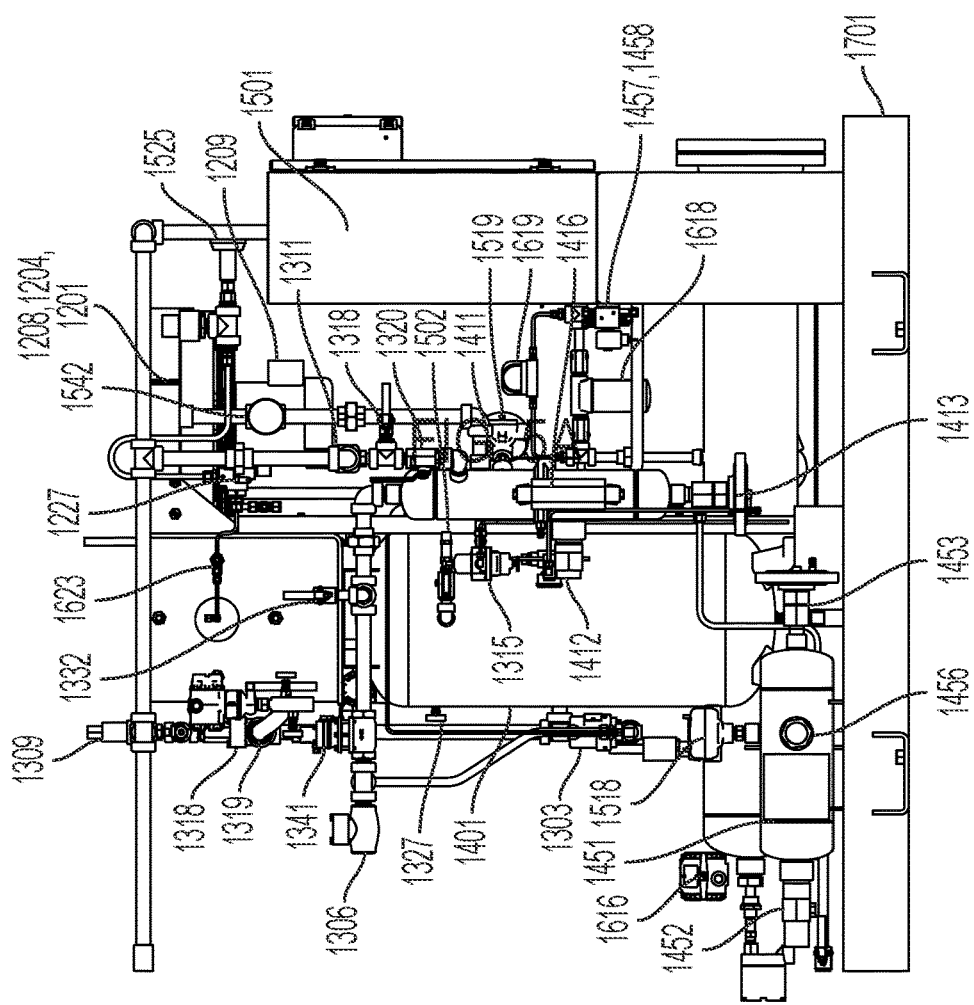
FIG. 5A is a top elevation view of the emission recovery unit shown in FIG. 4.

Referring to FIG. 3, the emissions recovery unit 1000 is fluidly coupled to an air supply (e.g., customer-supplied process air) 108 and fluidly coupled to a compressor packing case 100. In addition, the emission recovery unit 1000 can be fluidly coupled to other fugitive gas sources, pneumatic pumps, and valves 110. The system and process maintain a positive pressure in the packing case 100, and then evacuate the gas vapors 106 by producing a vacuum (e.g., about 150 psig) to capture and transport the leaking emissions 106 from the packing case 100 to the emissions recovery unit 1000. The system and process pressurize the recovered gas 106 to meet the existing pressure needed to reenter either the first stage of the compressor 102A or the compressor fuel gas systems 102B. The volumes vary as the packing case 100 leakage 106 changes, and in response, the system and process actuate control valves or operate pumps to maintain a constant vacuum to meet varying flow rates.

Turning now to FIGS. 4 through 11, wherein FIGS. 4 through 7 illustrate a dry gas emission recovery unit 1000 and FIGS. 8 through 11 illustrate wet gas emissions recovery unit 1000, and wherein like numerals of reference designate like elements throughout the several views, the emissions recovery unit 1000 includes a hermetically sealed compressor/motor 1001/1101 in fluid communication with an inlet vessel 1401, a gas/oil separation and stabilization assembly 1616/1621, a heat exchanger assembly 1201, a back pressure regulator valve 1341 or a condensate blowback vessel 1451 through a series of piping and valve members. Gas fluid flows through the unit 1000 along a gas flow path represented by arrows G, and oil fluid flows through the unit 1000 along an oil fluid flow path represented by arrows O. The inlet vessel 1401 is fluidly connected to the packing case 100, and the inlet vessel 1401 includes an inlet check valve 1305, a pressure relief valve 1309, and a pressure transducer 1502. The inlet vessel 1401 is also fluidly coupled to an upstream side of the compressor/motor 1001/1101. The compressor 1001 can be an encapsulated scroll compressor

1001, and the motor 1101 can be a variable frequency drive (VFD) (e.g., a three-phase 480 VAC VFD, 15 hp (11.2 kW) without packing or seal to prevent leaks).

A downstream side of the compressor/motor 1001/1101 is fluidly coupled to an upstream side to the gas/oil separation and stabilization assembly 1616/1621. The compressor/motor/1001/1101 forces the recovered gas from the inlet vessel 1401 along the gas flow path G through a discharge temperature transducer 1508 to the gas/oil separation and stabilization assembly 1616/1621, which includes an oil reservoir 1616, an gas/oil separator 1621, a temperature transducer 1531, a low oil level switch 1615, and an oil drain valve 1624. For wet gas applications (FIGS. 8-11), the gas/oil separation and stabilization assembly 1616/1621 further includes a stabilizer temperature transducer 1551 and a stabilizer heater 1552. The oil reservoir 1616 can include an upper and a lower sight glass 1617A and 1617B, and the gas/oil separator 1621 can include a separator filter 1625.

From the gas/oil separator 1621, the recovered gas flowed through a pressure relief valve 1311 and a differential pressure indicator ("DPI") gauge 1622, which may be configured to maintain a gas flow pressure of about 200 psig, into a gas cooler 1204 of the heat exchanger assembly 1201. Oil from the oil reservoir 116 is pumped through an oil filter 1618 or a DPI gauge 1619, through a coolant thermostatic valve (e.g., set at about 200° F.), and into a lube oil cooler 1208 of the heat exchanger assembly 1201. The heat exchanger assembly 1201 also includes a heat exchanger motor 1209 (e.g., a three-phase 480 VAC, ½ hp) that pumps the oil from the oil cooler 1208 along oil flow path O through an oil cooler discharge temperature indicator 1525, a compressor inlet check valve 1623, and back to the compressor 1101.

The heat exchanger motor 1209 pumps the gas from the gas cooler 1204 along gas flow path G through a gas cooler discharge temperature indicator 1541 and into the discharge separator 1411. The discharge separator 1411 can be fluidly coupled to a liquid level control 1412 and a high-pressure liquid level switch 1519. In addition, the discharge separator 1411 is fluidly coupled to the back pressure regulator 1341 (e.g., set at about 60 psi) along the gas flow path 102 to the discharge check valve 1306 before being flowed back to the compressor packing 100. The discharge separator 1411 is also fluidly connected to a pressure relief valve 1310 (e.g., set at about 200 psi) and to a condensate blowback vessel 1451 along the condensate flow path 104. A liquid level control 1452 and a high-pressure liquid level switch 1518 are fluidly coupled to the blowback vessel 1451, and the condensate flow 104 passes through a condensate control/check valve 1455 before being discharged from the unit 100.

Figure 6:
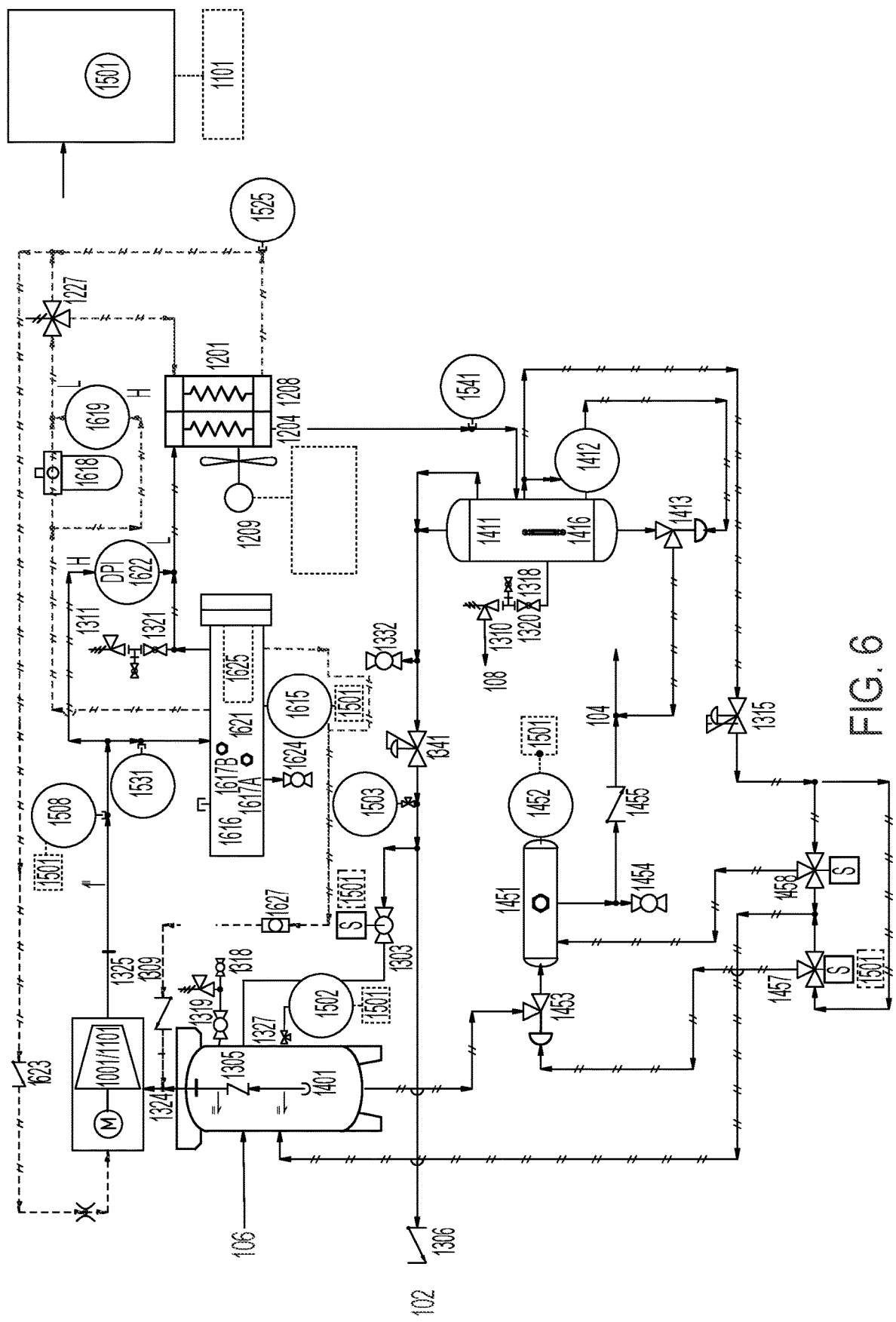
FIG. 6 is a piping and instrument diagram illustrating an example fluid flow through the emission recovery unit shown in FIGS. 4 and 5.
Figure 7:
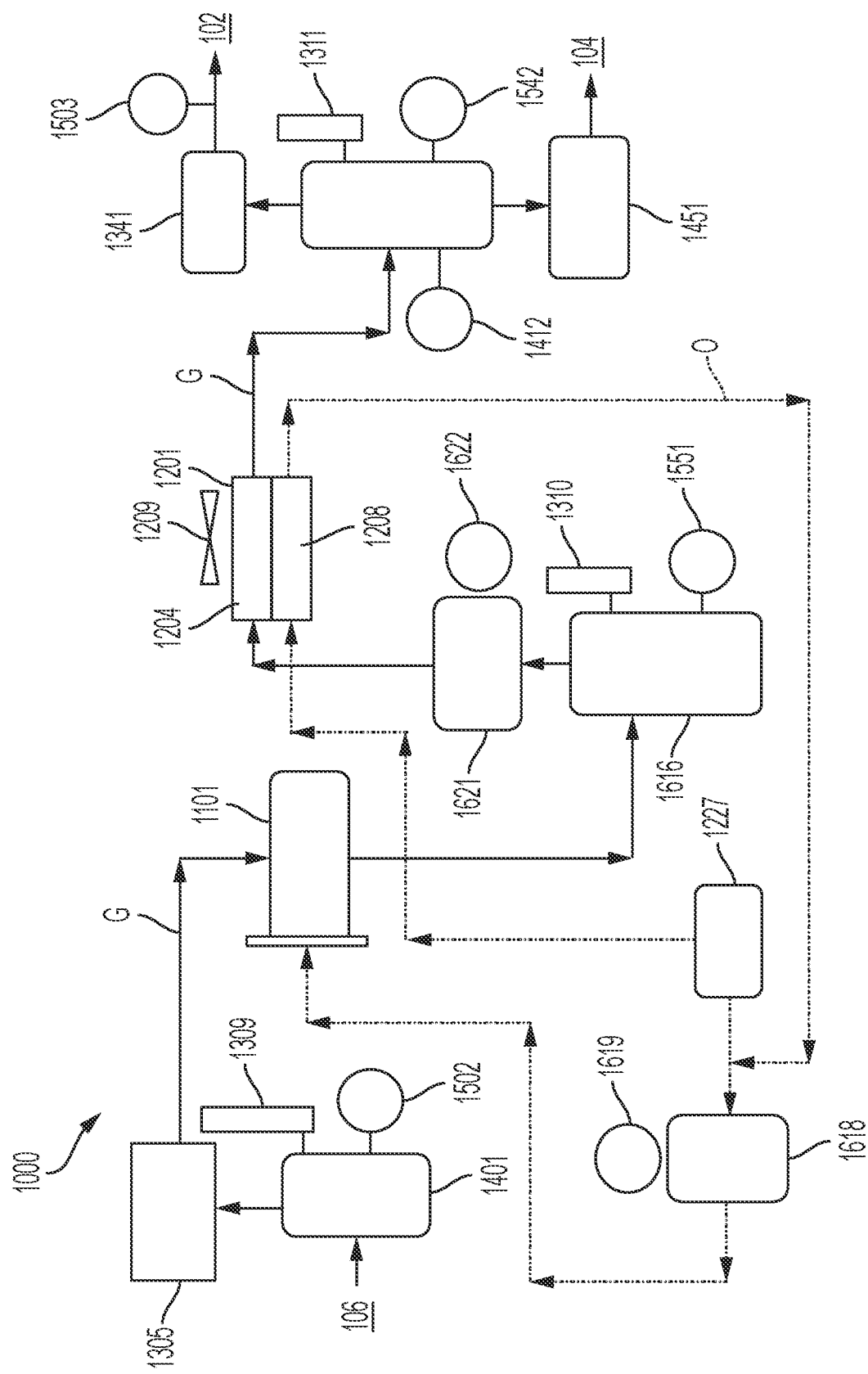
FIG. 7 is a process flow diagram for dry gas applications using the emission recovery unit shown in FIGS. 4 and 5.
Figure 8:
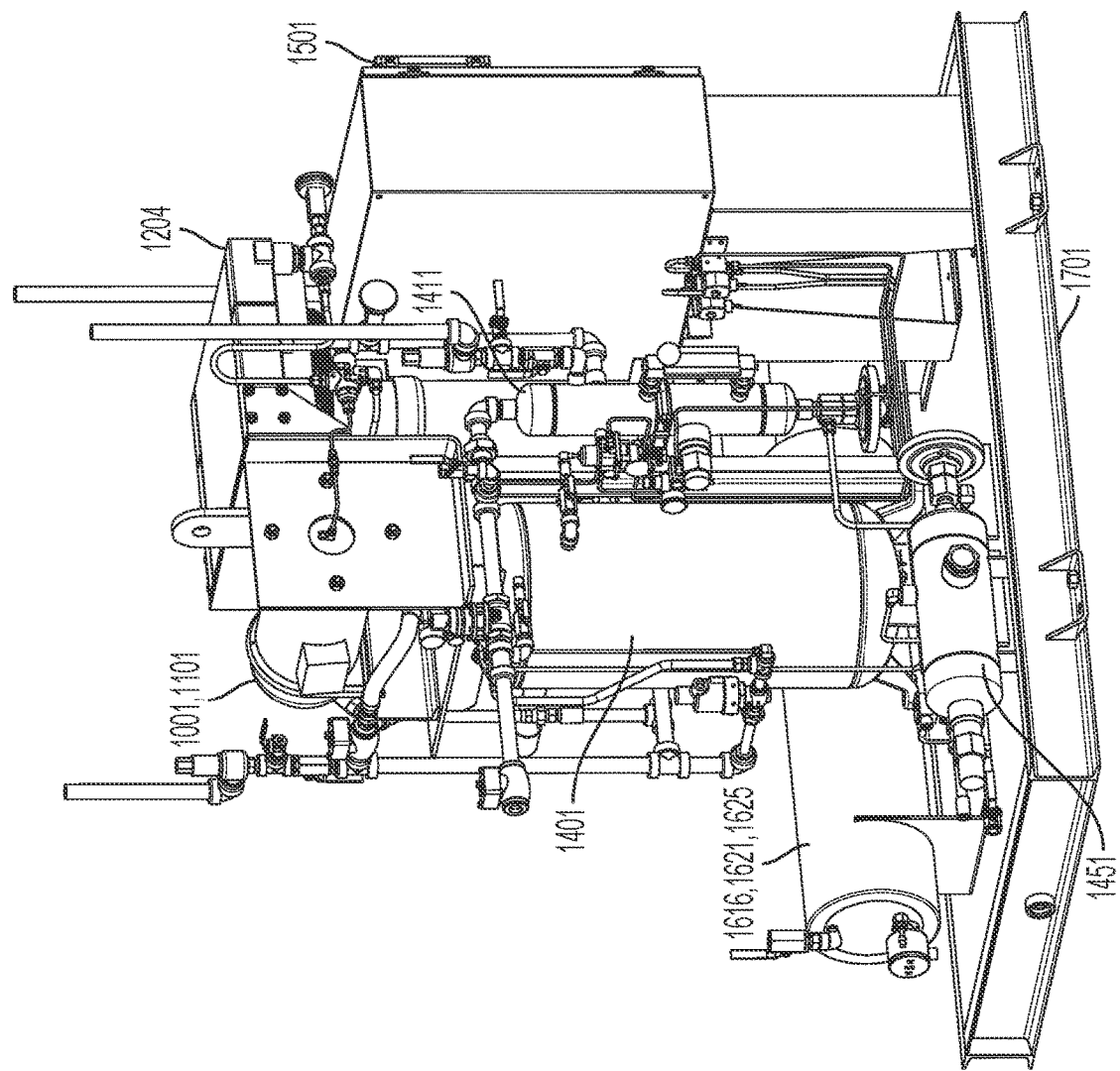
FIG. 8 is a perspective view of an example of an emission recovery unit for recovering wet gas emissions in accordance with an illustrative embodiment of the invention disclosed herein.
Figure 9A:
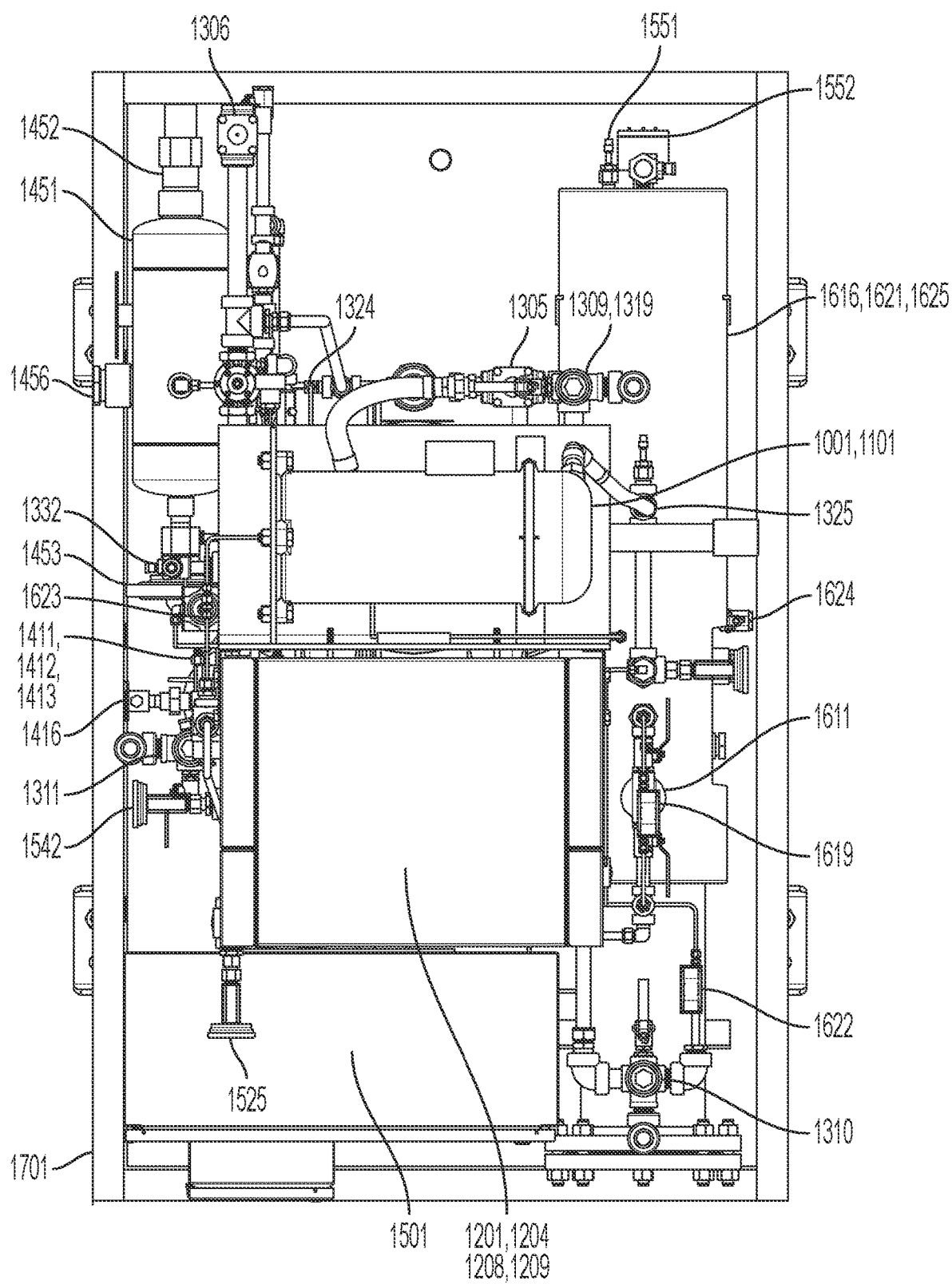
FIG. 9A is a top elevation view of the emission recovery unit shown in FIG. 8.
Figure 9B:
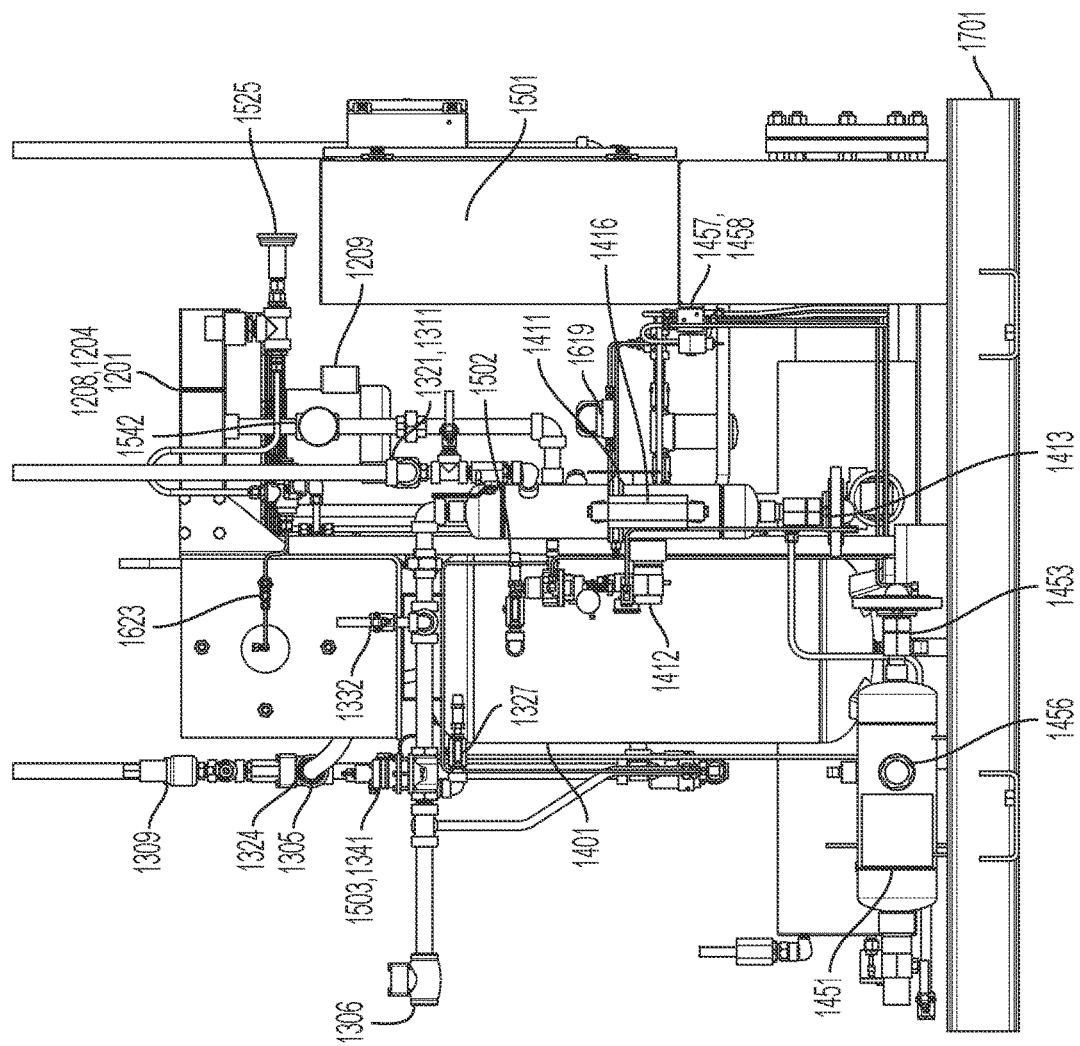
FIG. 9B is a first side elevation view of the emission recovery unit shown in FIG. 8.
Figure 9C:
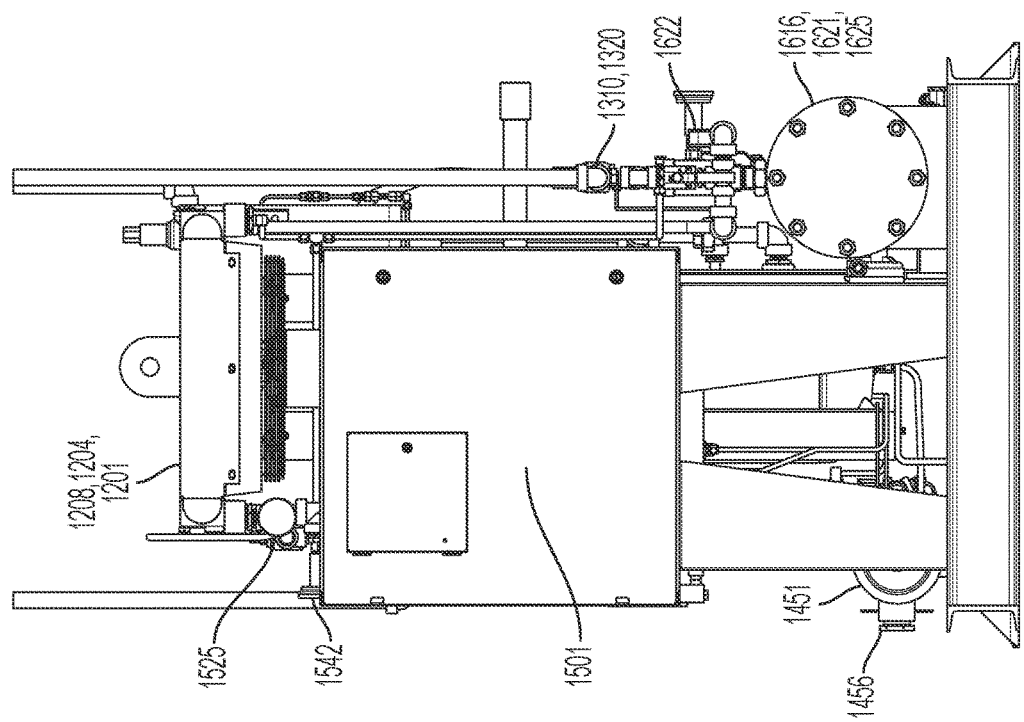
FIG. 9C is a front elevation view of the emission recovery unit shown in FIG. 8.
Figure 9D:
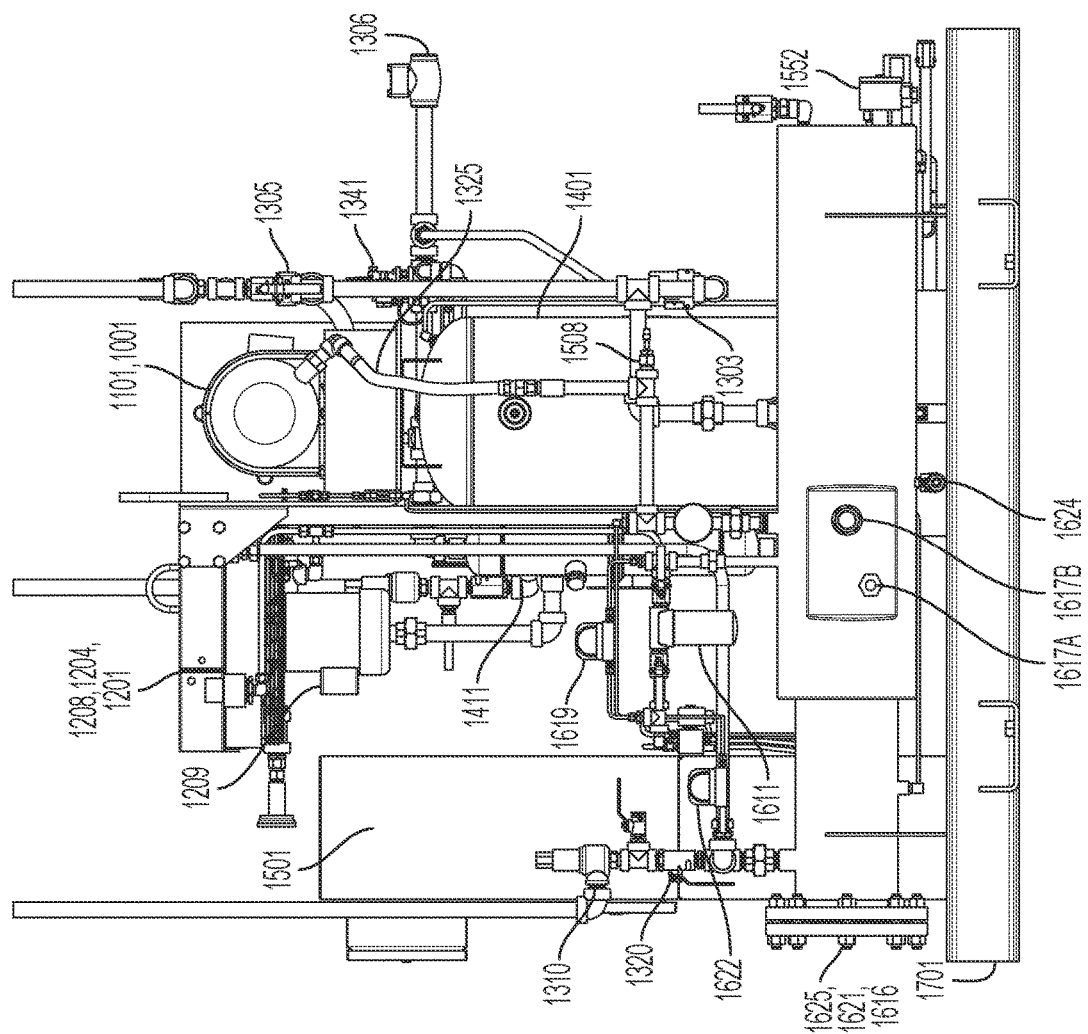
FIG. 9D is a second side elevation view of the emission recovery unit shown in FIG. 8.
Figure 10:
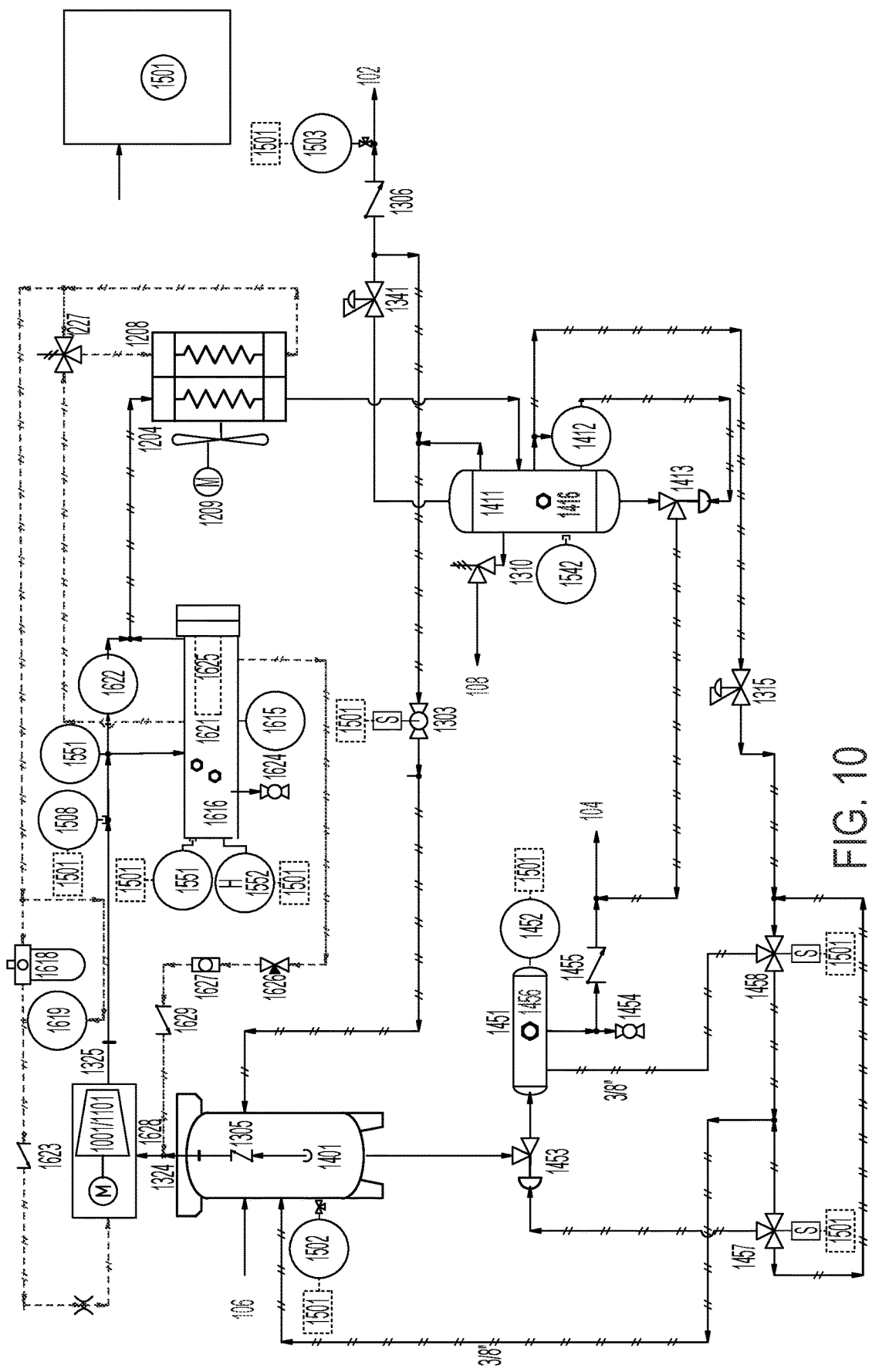
FIG. 10 is a piping and instrument diagram illustrating an example fluid flow through the emission recovery unit shown in FIGS. 8 and 9.
Figure 11:
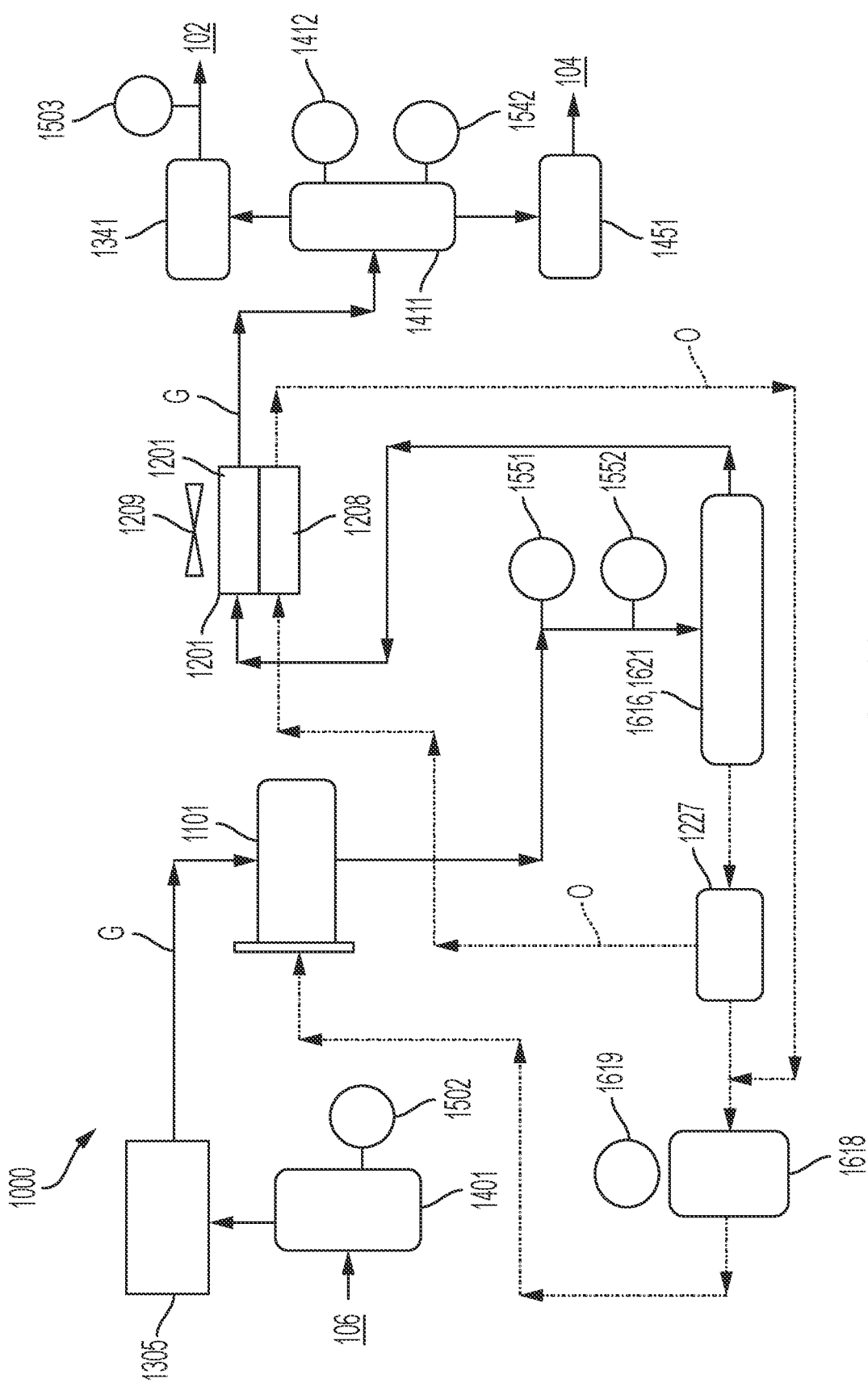
FIG. 11 is a process flow diagram for wet gas applications using the emission recovery unit shown in FIGS. 8 and 9.

Although the valve members of the system and process in the PI&D of FIGS. 6 and 10 are illustrated as pressure relief valves, relief valves, and check valves, the invention is not so limited and other types of valves may be used, including but not limited to, gate valves, globe valves, solenoid valves, hydraulic valves, motor-operated valves, powered valves, butterfly valves, flap valves, or any other form of shut-off valves to control or stop the flow of the air or gas through the piping of the emission recovery unit 1000.

In addition, the emissions recovery unit 1000 may be mounted on a skid or mobile unit 1701 to access hard-to-reach reciprocating compressor rod packing systems, such as in a gas or power plant that requires the skid or mobile unit able to fit on elevators or in an oil or gas field, pipeline exchange or storage hub. An optional weather-proof enclosure 1702 can protect the unit 1000, which as noted, can have a compact (e.g., 4×4 ft. (1.2×1.2 m)) footprint for ease of installation and utilization of space. The system and process for removing emissions can be a self-contained system that is automated with sensing capabilities for taking lubricant measurements or the like.

If programmable logic is used, such logic may execute on a commercially available processing platform or a special-purpose device. One of ordinary skill in the art may appreciate that embodiments of the disclosed subject matter can be practiced with various computer system configurations, including multi-core multi-processor systems, minicomputers, mainframe computers, computers linked or clustered with distributed functions, as well as pervasive or miniature computers that may be embedded into virtually any device. For example, a controller 1501 for automatic operation and capacity control. The control panel 1501 of the emission recovery unit 1000 can be an assembled PLC control panel per NEC Class I, Group D, Division II and include a customer interface and local fault annunciation. The control panel 1501 can contain control logic to properly operate and safeguard the unit 1000 during operation. In addition, the emission recovery unit 1000 can include various operational instruments, such as a high/low suction pressure transducer 1502, a high/low discharge pressure transducer 1503, a high discharge temperature transducer 1508, a condensate level controller level switch 1518, and a stabilizer oil temperature controller 1551 and PLC control, and other suitable instrumentation depending upon the particular application.

Moreover, the system and process disclosed herein can be implemented using a "smart application"-type software, allowing the system and process to be operated remotely by a tablet or smartphone. For example, the system and process may be implemented in a computer system using hardware, software, firmware, tangible computer-readable media having instructions stored thereon, or a combination thereof and may be implemented in one or more computer systems or other processing systems.

For instance, at least one processor device and a memory may be used to implement the above-described embodiments. A processor device may be a single processor, a plurality of processors, or combinations thereof. Processor devices may have one or more processor "cores."

Various embodiments of the inventions may be implemented in terms of this example computer system. After reading this description, it will become apparent to a person skilled in the relevant art how to implement one or more of the inventions using other computer systems and/or computer architectures. Although operations may be described as a sequential process, some of the operations may be performed in parallel, concurrently, and/or in a distributed environment and with program code stored locally or remotely for access by single or multi-processor machines. In addition, in some embodiments, the order of operations may be rearranged without departing from the spirit of the disclosed subject matter.

The processor device may be a special-purpose or a general-purpose processor device or maybe a cloud service wherein the processor device may reside in the cloud. As will be appreciated by persons skilled in the relevant art, the processor device may also be a single processor in a multi-core/multi-processor system, such system operating alone or in a cluster of computing devices operating in a cluster or server farm. The processor device is connected to a communication infrastructure, for example, a bus, message queue, network, or multi-core message-passing scheme.

The computer system also includes a main memory, for example, random access memory (RAM), and may also include a secondary memory. The secondary memory may include, for example, a hard disk drive or a removable storage drive. The removable storage drive may include a floppy disk drive, a magnetic tape drive, an optical disk drive, a flash memory, a Universal Serial Bus (USB) drive, or the like. The removable storage drive reads from and/or writes to a removable storage unit in a well-known manner. The removable storage unit may include a floppy disk, magnetic tape, optical disk, etc., which is read by and written to by the removable storage drive. As will be appreciated by persons skilled in the relevant art, the removable storage unit includes a computer usable storage medium having stored therein computer software and/or data.

The computer system (optionally) includes a display interface (which can include input and output devices such as keyboards, mice, etc.) that forwards graphics, text, and other data from communication infrastructure (or from a frame buffer not shown) for display on a display unit.

In alternative implementations, the secondary memory may include other similar means for allowing computer programs or other instructions to be loaded into the computer system. Such means may include, for example, the removable storage unit and an interface. Examples of such means may include a program cartridge and cartridge interface (such as that found in video game devices), a removable memory chip (such as an EPROM, PROM, or Flash memory) and associated socket, and other removable storage units and interfaces which allow software and data to be transferred from the removable storage unit to computer system.

The computer system may also include a communication interface. The communication interface allows software and data to be transferred between the computer system and external devices. The communication interface may include a modem, a network interface (such as an Ethernet card), a communication port, a PCMCIA slot, and card, or the like. Software and data transferred via the communication interface may be in the form of signals, which may be electronic, electromagnetic, optical, or other signals capable of being received by the communication interface. These signals may be provided to the communication interface via a communication path. Communication path carries signals, such as over a network in a distributed computing environment, for example, an intranet or the Internet, and may be implemented using wire or cable, fiber optics, a phone line, a cellular phone link, an RF link, or other communication channels.

In this document, the terms "computer program medium" and "computer usable medium" are used to generally refer to media such as removable storage unit, removable storage unit, and a hard disk installed in the hard disk drive. The computer program medium and computer usable medium may also refer to memories, such as main memory and secondary memory, which may be memory semiconductors (e.g., DRAMs, etc.) or cloud computing.

Computer programs (also called computer control logic) are stored in the main memory and/or the secondary memory. The computer programs may also be received via the communication interface. Such computer programs, when executed, enable the computer system to implement the embodiments as discussed herein, including but not limited to machine learning and advanced artificial intelligence. In particular, the computer programs, when executed, enable the processor device to implement the processes of the embodiments discussed here. Accordingly, such computer programs represent controllers of the computer system. Where the embodiments are implemented using software, the software may be stored in a computer program product and loaded into the computer system using the removable storage drive, the interface, the hard disk drive, or the communication interface.

Moreover, embodiments of the disclosure may be practiced with other computer system configurations, including hand-held devices, multi-processor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Embodiments of the inventions also may be directed to computer program products comprising software stored on any computer useable medium. Such software, when executed in one or more data processing devices, causes a data processing device(s) to operate as described herein. Embodiments of the inventions may employ any computer-useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The description of the invention is intended to be read in connection with the accompanying drawings, which are to be considered part of the entire written description of this invention. In the description, relative terms such as "front," "rear," "lower," "upper," "horizontal," "vertical," "above," "below," "up," "down," "top" and "bottom" as well as derivatives thereof (e.g., "horizontally," "downwardly," "upwardly" etc.) should be construed to refer to the orientation as then described or as shown in the drawings under discussion. These relative terms are for convenience of description and do not require that the machine be constructed or the process to be operated in a particular orientation. Terms, such as "connected," "connecting," "attached," "attaching," "join" and "joining" are used interchangeably and refer to one structure or surface being secured to another structure or surface or integrally fabricated in one piece.

The benefits and advantages described above may relate to one embodiment or may relate to several embodiments. The embodiments are not limited to those that solve any or all of the stated problems or those that have any or all of the stated benefits and advantages. The operations of the methods described herein may be carried out in any suitable order or simultaneously where appropriate. Additionally, individual blocks may be added or deleted from any of the methods without departing from the spirit and scope of the subject matter described herein. Aspects of any of the examples described above may be combined with aspects of any of the other examples described to form further examples without losing the effect sought.

The above description is given by way of example only, and various modifications may be made by those skilled in the art. The above specification, examples, and data provide a complete description of the structure and use of exemplary embodiments. Although various embodiments have been described above with a certain degree of particularity or with reference to one or more individual embodiments, those skilled in the art could make numerous alterations to the disclosed embodiments without departing from the scope of this specification.

TABLE 1

| Part/Reference Nos. | |
|---|---|
| 1001 | Compressor first stage |
| 1101 | Motor |
| 1201 | Heat exchanger assembly |
| 1204 | First stage aftercooler |
| 1208 | Lube oil cooler |
| 1209 | Heat exchanger motor |
| 1227 | Coolant thermostatic valve |
| 1303 | Automatic bypass valve |
| 1305 | First stage check valve |
| 1306 | Discharge check valve |
| 1309 | Relief valve for 1401 |
| 1310 | Relief valve for 1411 |
| 1311 | First-stage relief valve |
| 1315 | Instrument control regulator |
| 1317 | Discharge Isolation Valve |
| 1318 | Bleed Valve for 1401 |
| 1319 | Isolation Valve for 1401 |
| 1321 | First-stage isolation valve |
| 1324 | Compressor inlet flex line |
| 1325 | Compressor discharge flex line |
| 1327 | Pressure instrumentation isolation valve |
| 1329 | Control valve for scrubber/1451 |
| 1330 | Control valve for 1000/1451 |
| 1331 | Regulator for 1000/1451 |
| 1332 | Purge valve for 1451 |
| 1341 | Back pressure regulator |
| 1401 | Inlet vessel |
| 1407 | Condensate Pump |
| 1411 | Discharge separator |
| 1412 | Liquid level control for 1411 |
| 1413 | Dump valve discharge separator for 1411 |
| 1416 | Sight glass for 1411 |
| 1451 | Condensate blowback vessel |
| 1452 | Liquid level control for 1451 |
| 1453 | Control valve for 1451 |
| 1454 | Manual dump valve for 1451 |
| 1455 | Condensate control/check valve for 1451 |
| 1456 | Liquid level sight gauge for 1451 |
| 1457 | Solenoid valve for 1407/Liquid transfer controller for 1451 |
| 1458 | Vapor transfer controller for 1451 |
| 1501 | Control panel |
| 1502 | Inlet pressure transducer |
| 1503 | Discharge pressure transducer |
| 1505 | Blowdown pressure transducer |
| 1508 | Discharge temperature transducer |
| 1518 | Liquid level switch for 1451 |
| 1519 | Liquid level switch for 1411 |
| 1525 | Oil cooler discharge temperature indicator |
| 1531 | Compressor discharge temperature gauge |
| 1541 | Gas cooler discharge temperature indicator |
| 1551* | Stabilizer temperature transducer |
| 1552* | Stabilizer heater |
| 1553 | Blowdown/scrubber solenoid valve |
| 1554 | Blowdown/ERU solenoid valve |
| 1555 | Discharge isolation valve/ERU solenoid valve |
| 1615 | Low oil level switch for 1616 |
| 1616 | Oil reservoir |
| 1617A/B | Sight glass for 1616 |
| 1618 | Compressor oil filter |
| 1619 | Differential pressure indicator ("DPI") gauge for 1618 |
| 1621 | Gas/oil separator |
| 1622 | DPI gauge for 1621 |
| 1623 | Compressor inlet oil check valve |
| 1624 | Drain valve for 1616 |
| 1625 | Filter element for 1621 |
| 1626 | Needle valve for scavenge line from 1616/1625 |
| 1627 | Sight glass for scavenge line from 1616/1625 |
| 1628 | Check valve for scavenge line from 1616/1625 |
| 1701 | Skid |
| 1702 | Enclosure |

*FIGS. 8-11 only.

What is claimed is:

1. A system for recovering fugitive gas emissions, the system comprising:
an inlet vessel for storing the gas emissions, the inlet vessel positioned within a gas flow path of the system;
a compressor downstream of the inlet vessel, the compressor positioned within the gas flow path of the system;
an oil/gas separator downstream of the compressor, the oil/gas separator positioned within the gas flow path of the system and within an oil flow path of the system;
a heat exchanger downstream of the oil/gas separator, the heat exchanger positioned within the gas flow path of the system and within the oil flow path of the system;
a discharge separator downstream of the heat exchanger, the discharge separator positioned within the gas flow path of the system;
a backpressure regulator downstream of the discharge separator; and
a condensate blowback vessel downstream of the discharge separator.

2. The system of claim 1 wherein the compressor is an encapsulated scroll compressor.

3. The system of claim 1 wherein the compressor forces the gas emissions from the inlet vessel into the oil/gas separator.

4. The system of claim 2 further comprises a motor being a variable frequency drive.

5. The system of claim 1 wherein the oil/gas separator further comprises an oil reservoir.

6. The system of claim 4 wherein the oil/gas separator further comprises a heater.

7. The system of claim 1 wherein the heat exchanger further comprises a heat exchanger motor, a gas cooler, and an oil cooler.

8. The system of claim 1 wherein the backpressure regulator is configured to maintain a positive pressure of about 60 pounds per square inch.

9. The system of claim 1 further comprises a series of piping and valve members in fluid communication with the gas flow path of the system, the oil flow path of the system, or both.

10. A process for recovering fugitive gas emissions from a compressor packing case or a pneumatic component using the system of claim 1, the process comprising the steps of:
producing a positive pressure using the backpressure regulator in the compressor packing case or a pneumatic component;
producing a vacuum using the compressor to recover gas emissions from the compressor packing case or the pneumatic component;
pressurizing the recovered gas emissions; and
flowing the recovered gas emissions into the compressor packing case, the pneumatic component, or a compressor fuel gas system.

11. The process of claim 10 wherein the step of producing the vacuum further comprises producing a vacuum of about 150 psig using the compressor to recover the gas emissions from the compressor packing case or the pneumatic component.

12. The process of claim 10 further comprises recovering fugitive dry gas at up to about 970 Btu/CF and less than about 7 pounds water per MMCF.

13. The process of claim 10 further comprises recovering fugitive wet gas at up to 2500 Btu/CF.

14. The process of claim 13 further comprises the step of heating the recovered gas emissions using a heater of the oil/gas separator.

15. An emissions recovery unit for recovering gas emissions from a reciprocating compressor packing box, a gas-operated control valve or pump, or an oil and gas packing system, the unit comprising:

a compressor configured to produce a vacuum along a gas flow path of the unit;

a backpressure regulator downstream of the compressor; the backpressure regulator configured to maintain a positive pressure along the gas flow path of the unit;

an oil/gas separator having an oil reservoir; the oil/gas separator downstream of the compressor; the oil/gas separator in fluid communication with the back pressure regulator; the oil/gas separator positioned within the gas flow path of the unit and an oil flow path of the unit; wherein the compressor forces the gas emissions from the inlet vessel into the oil/gas separator;

a heat exchanger having a heat exchanger motor, a gas cooler, and an oil cooler; the heat exchanger downstream of the oil/gas separator; the heat exchanger in fluid communication with the compressor, the heat exchanger positioned within the gas flow path and the oil flow path of the unit; and an inlet vessel for storing the gas emissions, the inlet vessel positioned within the gas flow path of the system; the inlet vessel in fluid communication with the compressor.

16. The emissions recovery unit of claim 15 further comprises:

a discharge separator downstream of the heat exchanger; the discharge separator in fluid communication with the backpressure regulator; the discharge separator positioned within the gas flow path of the system; and a condensate blowback vessel downstream of the discharge separator; the condensate blowback vessel in fluid communication with the discharge separator; the condensate blowback vessel positioned within the gas flow path of the system.

17. The system of claim 15 wherein the oil/gas separator further comprises a heater.

18. A process for recovering gas emissions from a reciprocating compressor packing box, a gas-operated control valve or pump, or an oil and gas packing system using the emissions recovery unit of claim 15, the process comprising the steps of:

maintaining the positive pressure using the backpressure regulator in the compressor packing case or a pneumatic component;

maintaining the vacuum using the compressor to recover gas emissions from the compressor packing case or the pneumatic component;

processing the recovered gas emissions using the emissions recovery unit; and directing the processed gas emissions into the compressor packing case, the pneumatic component, or a compressor fuel gas system.

19. The process of claim 18 further comprises the step of heating the processed gas emissions using a heater of the oil/gas separator.

* * * * *